(12) United States Patent
White et al.

(10) Patent No.: US 11,660,587 B2
(45) Date of Patent: May 30, 2023

(54) CATALYSTS AND PROCESS FOR LIQUID HYDROCARBON FUEL PRODUCTION

(71) Applicant: Mississippi State University, Starkville, MS (US)

(72) Inventors: Mark G. White, Spring Hill, FL (US); Shetian Liu, Bartlesville, OK (US)

(73) Assignee: Mississippi State University, Starkville, MS (US)

( * ) Notice: Subject to any disclaimer, the term of this patent is extended or adjusted under 35 U.S.C. 154(b) by 0 days.

(21) Appl. No.: 17/108,886

(22) Filed: Dec. 1, 2020

(65) Prior Publication Data

US 2021/0077987 A1 Mar. 18, 2021

Related U.S. Application Data

(60) Division of application No. 15/714,238, filed on Sep. 25, 2017, now Pat. No. 10,850,266, which is a continuation-in-part of application No. 14/533,977, filed on Nov. 5, 2014, now abandoned, which is a division of application No. 12/806,340, filed on Aug. 10, 2010, now Pat. No. 8,906,971.

(60) Provisional application No. 61/273,856, filed on Aug. 10, 2009.

(51) Int. Cl.

| | |
|---|---|
| *B01J 29/48* | (2006.01) |
| *B01J 29/78* | (2006.01) |
| *B01J 29/08* | (2006.01) |
| *B01J 23/28* | (2006.01) |
| *C10L 3/12* | (2006.01) |
| *C10L 1/08* | (2006.01) |
| *C10G 2/00* | (2006.01) |
| *B01J 37/02* | (2006.01) |
| *B01J 29/16* | (2006.01) |
| *B01J 29/076* | (2006.01) |
| *B01J 29/26* | (2006.01) |
| *B01J 29/03* | (2006.01) |

(52) U.S. Cl.
CPC ........... *B01J 29/7815* (2013.01); *B01J 23/28* (2013.01); *B01J 29/076* (2013.01); *B01J 29/084* (2013.01); *B01J 29/166* (2013.01); *B01J 29/48* (2013.01); *B01J 29/78* (2013.01); *B01J 37/0201* (2013.01); *C10G 2/334* (2013.01); *C10L 1/08* (2013.01); *C10L 3/12* (2013.01); *B01J 29/0341* (2013.01); *B01J 29/26* (2013.01); *B01J 29/7876* (2013.01); *B01J 2229/18* (2013.01); *C10G 2400/30* (2013.01)

(58) Field of Classification Search
CPC ...... C10G 2/334; B01J 29/48; B01J 2229/183
See application file for complete search history.

(56) References Cited

U.S. PATENT DOCUMENTS

| | | | |
|---|---|---|---|
| 4,480,145 A | 10/1984 | Brennan et al. | |
| 4,556,645 A * | 12/1985 | Coughlin | C07C 1/043 502/66 |
| 4,587,008 A * | 5/1986 | Minderhoud | C07C 1/0485 208/109 |
| 6,603,048 B1 | 8/2003 | Corbin | |
| 8,906,971 B2 * | 12/2014 | White | C10G 2/334 518/714 |
| 2003/0009071 A1 | 1/2003 | Doll | |
| 2004/0014593 A1 | 1/2004 | Le Van Mao | |
| 2009/0076316 A1 | 3/2009 | Ichikawa | |
| 2009/0163752 A1 | 6/2009 | Brown | |
| 2015/0210622 A1 | 7/2015 | Saravanamurugan | |

OTHER PUBLICATIONS

Z. Liu et al., Screening of Alkali-Promoted Vapor-Phase-Synthesized Molybdenum Sulfide Catalysts for the Production of Alcohols from Synthesis Gas, 36 Ind. Eng. Chem. Res. 3085-3093 (1997).*
S. Liu et al., Synthesis of Gasoline-Range Hydrocarbons over Mo/HZSM-5 Catalysts, 357 Appl. Catal. A 18-25 (2009).*
Gujar, et al.; Reactions of Methanol and Higher Alcohols over H-ZSM-5; Applied Catalysis, A. General 363; 2009; pp. 115-121.
Fang, et al.: A short review of heterogeneous catalytic process for mixed alcohols synthesis via syngas; Catalysis Today: vol. 147 (2); Sep. 30, 2009; pp. 133-138.
Liu, et al., Screening of Alkali-Promoted Vapor-Phase-Synthesized Molybdenum Sulfide Catalysts for the Production of Alcohols from Synthesis Gas, 36; Ind. Eng. Chem. Res; 1997; pp. 3085-3093.
Liu, et al., Synthesis of Gasoline-Range Hydrocarbons over Mo/HZSM-5 Catalysts; 357; Appl. Catal. A; 2009; pp. 18-25.
Fattahi, et al., Synthesis promotion and product distribution for HZSM-5 and modified Zn/HZSM-5 catalysts for MTG process; Fuel 181 (2016) 248-258.
Pan, et al., Direct synthesis of HZSM-5 from natural clay; J. Mater. Chem. A, 2015,3, 4058-4066.
Chen, et al., Acidity Characterization of H-ZSM-5 Catalysts Modified By Pre-Coking and Silylation, Proceedings: 14th International Zeolite Conference, Apr. 25-30, 2004, Cape Town, South Africa.
Kumar, et al., Absorptive hydrogen scavenging for enhanced aromatics yield during non-oxidative methane dehydroaromatization on Mo/H-ZSM-5 catalysts, http://dx.doi.org/10.1002/anie.201809433.
Lacheen, et al., Stability, structure, and oxidation state of Mo/H-ZSM-5 catalysts during reactions of CH4 and CH4—CO2 mixtures, Journal of Catalysis 230 (2005) 173-185.
Li, et al., Raman and X-Ray Absorption Studies of Mo Species in Mo/H-ZSM5 Catalysts for Non-Oxidative CH4 Reactions, Journal of Catalysis 191, 373-383 (2000).
Ha, et al., Aromatization of methane over zeolite supported molybdenum: active sites and reaction mechanism Journal of Molecular Catalysis A: Chemical 181 (2002) 283-290.
Tan, et al., The effect of calcination temperature on the catalytic performace of 2 wt. % Mo/HZSM-5 in methane aromatization, 228 Apl. Catal., 115-125 (2002).

* cited by examiner

*Primary Examiner* — Randy Boyer
(74) *Attorney, Agent, or Firm* — Stites & Harbison PLLC; Richard S. Myers, Jr.

(57) ABSTRACT

The present invention provides a novel process and system in which a mixture of carbon monoxide and hydrogen synthesis gas, or syngas, is converted into hydrocarbon mixtures composed of high quality gasoline components, aromatic compounds, and lower molecular weight gaseous olefins in one reactor or step. The invention utilizes a novel molybdenum-zeolite catalyst in high pressure hydrogen for conversion, as well as a novel rhenium-zeolite catalyst in place of the molybdenum-zeolite catalyst, and provides for use of the novel catalysts in the process and system of the invention.

10 Claims, 1 Drawing Sheet

Figure 2: Ratio of liquid yields/$CO_2$ yields vs. the ratio of millimol Mo species/millimol framework Al species. Reaction conditions: Gas Hourly Space Velocity = 3000 $h^{-1}$, $H_2$/CO feed ration = 1 mol/1mol.

CATALYSTS AND PROCESS FOR LIQUID HYDROCARBON FUEL PRODUCTION

CROSS-REFERENCE TO RELATED APPLICATION

This application claims priority to U.S. Ser. No. 15/714,238, filed Sep. 25, 2017, which is a continuation-in-part of U.S. Ser. No. 14/533,977, filed Nov. 5, 2014, which is a divisional of U.S. Ser. No. 12/806,340, filed Aug. 10, 2010, now U.S. Pat. No. 8,906,971, which claims benefit of U.S. Provisional Patent Application Ser. No. 61/273,856 filed Aug. 10, 2009. The above applications are incorporated herein by reference.

STATEMENT OF GOVERNMENT SUPPORT

This invention was made with government support under Contract No. DE-FG3606GO86025 awarded by the U.S. Department of Energy. The government may have certain rights in the invention.

FIELD OF THE INVENTION

This invention relates to the field of syngas conversion and more specifically to the field of converting synthesis gas to high quality hydrocarbon mixtures and includes the novel catalysts involved in such conversion.

BACKGROUND OF THE INVENTION

The Fischer-Tropsch process involves a catalyzed chemical reaction whereby synthesis gas, which is a mixture of carbon monoxide and hydrogen, is converted into liquid hydrocarbons. The most common catalysts generally used in the process are based on iron, cobalt, nickel, and ruthenium. The catalysts generally contain, in addition to the active metal, a number of promoters as well as high surface area binders/supporters such as silica, alumina, or zeolites. This process, which has been in commercial use for many years, produces higher hydrocarbon materials in the form of synthetic petroleum substitutes from coal, natural gas, heavier oil, or solid biomass for use as synthetic lubrication oil or synthetic fuel. The process involves multiple competing chemical reactions that subsequently result in both desirable products and undesirable byproducts.

Numerous patents exist that involve the Fischer-Tropsch synthesis process and catalysts used in such syntheses. However, the present invention discloses a novel process utilizing novel catalysts to produce high quality liquid hydrocarbons in only one step, thereby eliminating the necessity for typical further processing and effectively eliminating one or more processing steps or reactors and producing high quality hydrocarbon products via only one reactor.

The present invention discloses a novel process and system in which syngas is converted into high quality gasoline components, aromatic compounds, and lower molecular olefins in one reactor. Moreover, the process utilizes a novel molybdenum-zeolite catalyst in high pressure hydrogen for conversion. Additionally, the process also utilizes a novel rhenium-zeolite catalyst in place of the molybdenum-zeolite catalyst in high pressure hydrogen for conversion.

SUMMARY OF THE INVENTION

The present invention provides for novel catalysts and a novel process and system for utilizing these catalysts for converting low $H_2$/CO molar ratio synthesis gas to hydrocarbon mixtures composed of high quality gasoline, low molecular weight gaseous olefins, and/or benzene/naphthalene-derived aromatic compounds. The composition of the liquid hydrocarbon phase can be adjusted to show >90% aromatics (e. g., benzene, toluene, and para-xylene) using HZSM-5 as the acid function; whereas, the H—Y-faujasite acid catalyst produces a liquid having a composition of >90% iso-paraffins and cyclo-paraffins. The invention is distinct and different from existing prior art and processes in many respects including, but not limited to: the catalysts use molybdenum (Mo) or rhenium (Re) as the main active components for the reaction; the catalysts use a zeolite (HZSM-5, Y, Mordenite, MCM-22, MCM-41, H—Y-faujasite, H-beta, and the like) as the supporting material; the active phase of the catalysts is composed of carburized/reduced Mo-species (Re) or a non-zeolite, such as silica-alumina, heteropolyacid; the reaction proceeds mainly inside cages of the zeolite support, which effectively inhibits the formation of heavier linear-chain hydrocarbons (>$C_7$); and the catalysts produce alcohols (methanol, ethanol, and propanol) as the primary intermediate products for hydrocarbon formation which results from the dehydration of these alcohols. Moreover, the process of the present invention effectively removes one or more reactors in the process of producing high quality gasoline hydrocarbon products and produces such products from syngas in one step. The zeolite pore size typically ranges from about 0.4 to about 0.7 nm.

This invention demonstrates how a mixture of carbon monoxide and hydrogen (synthesis gas) can be converted into various hydrocarbon products. The origin of the synthesis gas may be from biorenewable sources such as biomass, grass, woody biomass, wastewater treatment sludges, industrial and municipal, and any type of lignocelluloses. In addition, the source of the synthesis gas can be derived from petroleum sources such as natural gas, light hydrocarbons, liquid hydrocarbons, or petroleum coke. Finally, the synthesis gas can be developed from a host of alternative sources of carbon such as coal, lignite, tar sands, shale oils, coal bed methane, and the hydrocarbon "ices" such as methane hydrate, and mixtures of light gas hydrates.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages.

DETAILED DESCRIPTION OF THE INVENTION

Figure 1:
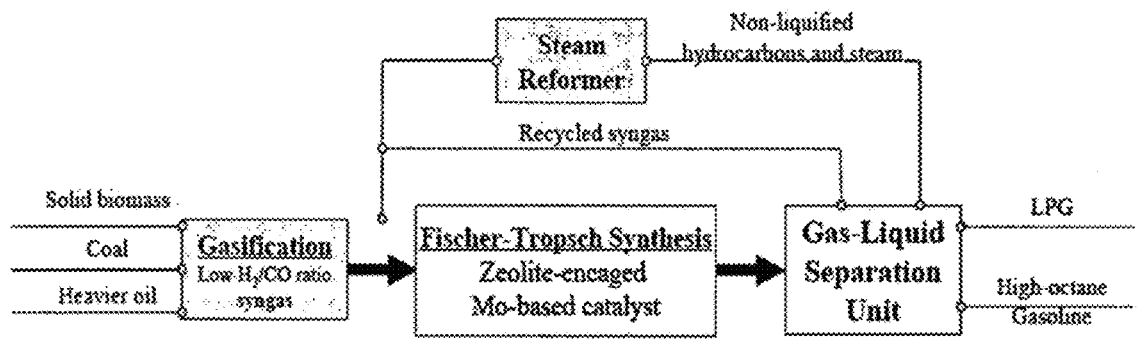
FIG. 1 is a graphical illustration of the overall process of the present invention.
Figure 2:
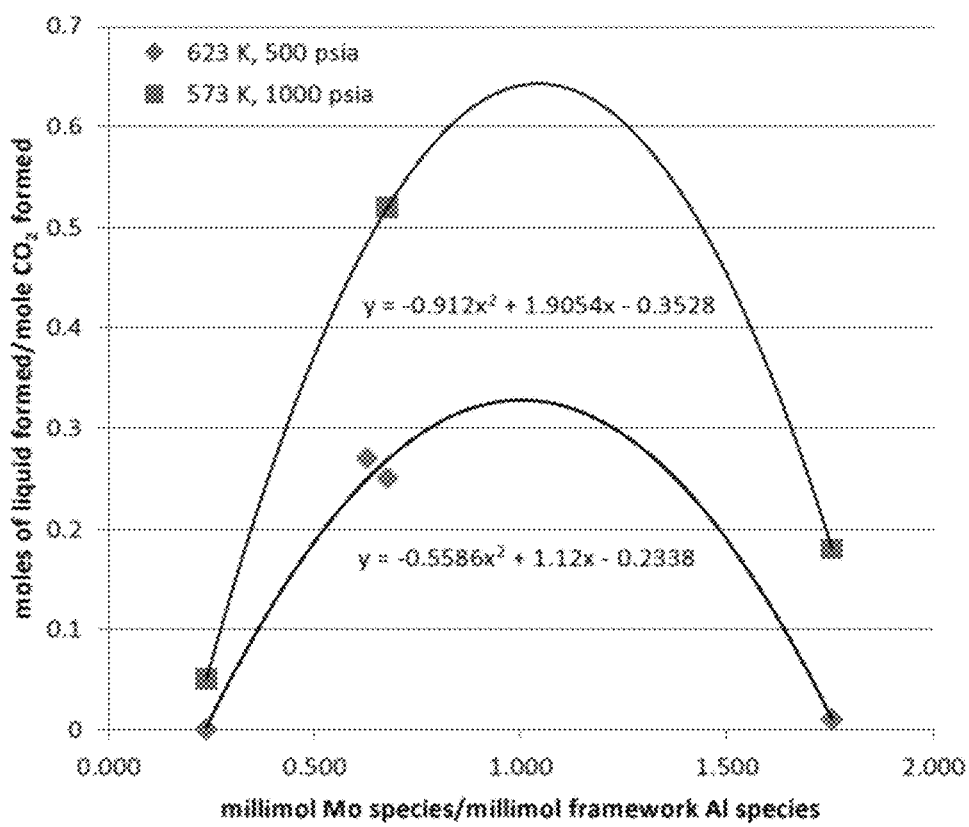
FIG. 2 is a graphical illustration showing the response of selectivity ratio (liquid hydrogens/$CO_2$) versus the composition of the finished catalyst (millimol MO species/millimol framework Al). These data show a non-linear response (parabolic) of this selectivity ratio versus the ratio of Mo/Al (framework). Both parabolas unexpectedly show maximum values when the abscissa values are near unity (1.07 for 573 K data; and 1.002 for 623 K data). One interpretation of these data is that maximum selectivity for liquids is realized when the number of Mo species is in about even ratio of framework Al species of the finished catalyst. These data were obtained under the conditions of low CO conversion (~15%) so that the coke yields were very low (<0.1 wt % carbon/catalyst).

The present invention discloses a process and system for the conversion of a mixture of carbon monoxide and hydrogen (synthesis gas) into various hydrocarbon products. The origin of the synthesis gas may be from biorenewable sources including, but not limited to, biomass, grass, woody biomass, wastewater treatment sludges, industrial and municipal, and any type of lignocelluloses. In addition, the source of the synthesis gas can be derived from petroleum sources such as natural gas, light hydrocarbons, liquid hydrocarbons, or petroleum coke. Finally, the synthesis gas can be developed from a host of alternative sources of carbon such as coal, lignite, tar sands, shale oils, coal bed methane, and the hydrocarbon "ices" such as methane hydrate, and mixtures of light gas hydrates.

The present invention comprises solid catalysts for the selective conversion of a gas mixture containing carbon monoxide and hydrogen as the major components into liquid hydrocarbons. One novel element of this technology is the use of a bi-functional catalyst: (1) showing a metal component that converts the CO and $H_2$ into alcohols; and (2) showing an acid component that converts the alcohols into olefins, alkanes, branched alkanes, cyclic alkanes, and aromatics. The choice of a catalyst that produces alcohol intermediates circumvents the problems of a broad molecular weight distribution of the products that plagues other synthesis gas conversion catalysts and techniques which employ CO-insertion chemistry as the chain growth mechanism. When the metal component is chosen to produce a mixture of higher-molecular-weight alcohols, such as ethanol, propanol, etc. and oxygenates, the chemical equilibrium reactions do not limit the conversion of synthesis gas as has been observed when the intermediate product is only methanol.

The synthesis gas conversion into higher-molecular-weight alcohols of the present invention was achieved using a transition metal that was active as either the oxide or the sulfide. This last consideration allows the use of the catalyst in feed streams that show sulfur-containing compounds in low concentrations as might be encountered in synthesis gas obtained from gasification of coals and petroleum coke products. Such a sulfur-tolerant catalyst precludes the need for desulfurization of the raw synthesis gas stream.

An additional consideration for the choice of the metal syngas conversion catalyst component is the desirability for producing higher molecular weight alcohols. It has been shown that the reaction rate to form gasoline liquids over H-ZSM-5 was 8-10 times higher when the substrate was butanol rather than methanol. Amit C. Gujar, Vamshi Krishna Guda, Michael Nolan, Qiangu Yan, Hossein Toghiani, and Mark G. White, "Reactions of Methanol and Higher Alcohols over H-ZSM-5", *Applied Catalysis, A. General* 363 (2009) 115-121. Thus, a metal synthesis gas conversion catalyst that produces higher-molecular-weight-alcohol intermediates is highly desirable over a metal catalyst that makes only methanol as an intermediate.

An essential part of the novel design of the present invention is the use of metal-containing, acidic solids that show a pore structure which determines the types of hydrocarbon products obtained under reaction conditions. That is, the reaction products obtained over a medium-pore zeolite such as H-ZSM-5 show a high preference for aromatic hydrocarbons (>80%) over alkanes and alkenes. By increasing the size of the acidic pore structure, such as that found in H—Y zeolite, one can realize a catalyst that favors the formation of long, branched-chain and cyclic alkanes and alkenes with less than 10% aromatics. Finally, with the use of zeolite such as H-beta, one obtains hydrocarbon products showing only $C_1$-$C_3$ alkanes and alkenes. This novel concept of the present invention of shape and/or size selectivity can be extended to other porous, acidic solids to develop the desired hydrocarbon products to include distillates such as jet, diesel, and kerosene.

Additional metals and non-metals are often added to a catalyst formulation to improve the properties and performance of the catalyst. In the case of the alcohol-forming metal component, alkali and alkali earths are added in low loadings to the metal to decrease the carbon dioxide forming reactions, such as the water gas shift reaction. Zhenyu Liu, Xianguo Li, Michael R. Close, Edwin L. Kugler, Jeffrey L. Petersen, and Dady B. Dadyburjor, "Screening of Alkali-Promoted Vapor-Phase-Synthesized Molybdenum Sulfide Catalysts for the Production of Alcohols from Synthesis Gas", *Ind. Eng. Chem. Res.*, 1997, 36 (8), pp. 3085-3093. Also, changing the metal oxide to the metal sulfide has been shown to decrease the conversion of carbon monoxide to carbon dioxide. Kegong Fang, Debao Li, Minggui Lin, Minglin Xiang, Wei Wei and Yuhan Sun, "A short review of heterogeneous catalytic process for mixed alcohols synthesis via syngas", *Catalysis Today*, Volume 147, Issue 2, 30 Sep. 2009, pp. 133-138. Accordingly, the metal syngas conversion component will be modified with the addition of alkali and alkaline earth oxides together with sulfiding of the metal to form the metal sulfide.

The catalytic agent to accomplish the conversion of the present invention in a single catalyst bed is comprised of two functions which are inculcated into the catalyst particles: a CO conversion element which reduces the carbon monoxide into organic acids, esters, aldehydes, ketones, ethers, and alcohols; and an oxygenate dehydration/decarboxylation conversion element which reduces this list of oxygenates (organic acids, esters, aldehydes, ketones, ethers, and alcohols) into hydrocarbons, carbon dioxide, and water.

The oxygenate dehydration/decarboxylation conversion element may be chosen from a family of high surface area, acidic solids such as the crystalline, alumino-silicates (W-ZSM-5, Y-faujasite, H-beta, X-faujasite, mordenite, etc.), the mesoporous solids derived from the sol/gel/template process (MCM-41, etc.), or the amorphous silica alumina, and heteropolyacids, etc. The choice of acidic solid will determine the types of hydrocarbons that will be made by this process. For example, when the acidic solid is $H^+$-ZSM-5, a highly acidic, medium-sized pore (~0.56 nm) zeolite, then the hydrocarbon liquids will be characterized by a composition that is >90 wt % aromatics with the remainder being paraffins/iso-paraffins. When the acidic solid is Y-faujasite, a large-pore zeolite, ~0.9 nm, of intermediate acidity, the liquid products are >90 wt % cyclopar-affins and iso-paraffins with the remainder being aromatic compounds. Finally, for an acidic solid such as H-beta, no liquid hydrocarbons are produced and the light hydrocarbon gases are characterized by large amounts of ethylene and propylene. The metals mentioned above may be deposited onto these high surface area supports using the technique known as incipient wetness technique or also known as the "pore filling" technique.

The CO conversion element which reduces the carbon monoxide into the oxygenates can be chosen from a list of transition metals to include molybdenum, rhodium, rhenium, and combinations of these metals/metal oxides. Some of these transition metals may be converted to the sulfide state, $MoS_2$, to enhance the selectivity to the desired hydrocarbons. Other catalyst cluster materials which may be added to promote the desired reactions include at least one metal modifier member of the elements of Groups IA and IIA of the Periodic Table, as referenced by S. R. Radel and M. H. Navidi, in Chemistry, West Publishing Company, New York, 1990, and mixtures of these elements, including but not limited to lithium, sodium, potassium, rubidium, cesium, beryllium, magnesium, calcium, strontium, and barium.

The present invention discloses novel catalysts and a novel process and system utilizing these catalysts for converting low $H_2$/CO molar ratio synthesis gas to hydrocarbon mixtures composed of high quality gasoline, low molecular weight gaseous olefins, and/or benzene/naphthalene-derived aromatic compounds. The invention uses catalysts comprising molybdenum (Mo) or rhenium (Re) as the main active components for the reaction. The catalysts use a zeolite (HZSM-5, Y, Mordenite, MCM-22, MCM-41, H—Y-faujasite, H-beta, and the like) as the supporting material. The active phase of the catalysts is composed of carburized/reduced Mo-species (Re) or a non-zeolite, such as silica-alumina, heteropolyacid, while the reaction proceeds mainly inside cages of the zeolite support, which thereby effectively inhibits the formation of heavier linear-chain hydrocarbons ($>C_7$). Finally, the catalysts produce alcohols (methanol, ethanol, and propanol) as the primary intermediate products for hydrocarbon formation which results from the dehydration of these alcohols. The process of the present invention removes one or more reactors in the process of producing high quality gasoline hydrocarbon products and produces such products from syngas in only one step or reactor.

Another feature of the present invention is the Mo/framework Al ratio of the zeolite structure. In embodiments of the present invention, the number of Mo species in the zeolite structure is equal or close to equal to the number of Al species left in the zeolite framework after the catalyst has been made. Also present in the zeolite is an amorphous Al residue that is not catalytically active for the reactions of interest. When the molybdenum species enters the zeolite during the catalyst preparation, these Mo species displace some of the framework aluminum species on a one-for-one basis. For example, if 10,000 framework aluminum species were present initially in a zeolite, and if 5,000 Mo species were introduced into the zeolite, then 5,000 framework Al species would be displaced from the zeolite to leave (10,000−5,000)=5,000 framework Al species behind in the zeolite. Thus, this assembly of Mo species in the zeolite equals the number of framework Al species left in the framework (i.e., Mo/framework Al=1). Each of these remaining framework Al species are associated with one proton, and each proton is highly acidic and capable of converting alcohols to aromatics. Each of the Mo species in the zeolite is capable of reacting with syngas to make alcohols. And the reaction sequence: syngas→alcohols→aromatics is a series reaction network so that at steady state, the rate of reaction to form alcohols is equal to the rate of alcohol consumption to form aromatics when the number of Mo species equals the number of framework Al species which equals the number of highly acidic protons.

When the number of Mo species is not equal to the number of Al species (ergo, number of protons), 1 then the rate of alcohol formation does not equal the rate of alcohol consumption and the overall rate of reaction becomes equal to the limiting reaction rate.

The present inventors have found that when the value at Mo/framework Al is at about 1, the maximum amount of liquids/aromatics are produced. Thus, in embodiments of the present invention, the material catalyzes two reactions which are in series: synthesis gas to mixtures of alcohols using Mo, and the further conversion of mixed alcohols to a mixture of olefins, aromatics and iso-paraffins using framework Al acid sites. The reaction rates of the two classes of reactions dictate that the number of Mo sites be about equal to framework Al acid sites so as to obtain the optimum yields of liquid hydrocarbons.

Thus, in embodiments of the present invention, the Mo/Al framework ratio is about 0.5 to about 1.5. In other embodiment, it is about 0.6 to about 1.4. In other embodiments, it is about 0.7 to about 1.3. In other embodiments, it is about 0.8 to about 1.2. In other embodiments, it is about 0.9 to about 1.1. In other embodiments, it is about 1.0 to about 1.0. In other embodiments, it is about 1.1 to about 0.9. In other embodiments, it is about 1.2 to about 0.8. In other embodiments, it is about 1.3 to about 0.7. In other embodiments, it is about 1.4 to about 0.6. In other embodiments, it is about 1.5 to about 0.5.

The novel catalysts are suitable for synthesis using lower $H_2$/CO molar ratio syngas and comprise carburized/reduced Mo-species (Re), a zeolite, and at least one alkali metal as the promoter, where the metal is selected from elements of Groups IA and IIA of the Periodic Chart and combinations or mixtures thereof. In one formulation or embodiment, these catalysts produce liquid hydrocarbons enriched with lower branched alkanes and alkyl-substituted aromatics. The aromatics content of the hydrocarbon liquids can be greatly reduced when the H-ZSM-5 is replaced with H—Y-faujasite to make a liquid product that is mainly iso- and cyclo-paraffins. The catalysts and process of the present invention produce mainly branched alkanes and alkyl-substituted aromatics as high quality gasoline components, which differs from traditional Fe- and Co-based Fischer-Tropsch synthesis and catalysts that produce mainly linear-chain hydrocarbons and that requires further processing via additional steps or reactors.

The process and system of the present invention converts syngas into high quality gasoline components (more than 90% branched/cyclic products) in one reactor. The conversion occurs over an alcohol-forming catalyst found in the same matrix as a gasoline-forming catalyst, whereby the alcohol-forming catalyst creates or produces higher alcohols from syngas. One embodiment of the present invention is a process whereby syngas is converted into high quality gasoline hydrocarbon components (more than 90% branched/cyclic paraffin products) over a molybdenum-zeolite catalyst in high pressure hydrogen. The molybdenum allows the conversion of olefins/lower alcohols (that are initially formed in the catalytic process) into higher alcohols ($C_2$, $C_3$, $C_4$). The zeolite allows the conversion of syngas into hydrocarbons; alcohols into liquid hydrocarbons; higher alcohols into aromatic liquid hydrocarbons; and long, linear hydrocarbons into branched/cyclic hydrocarbons. Another embodiment of the present invention is a process whereby syngas is converted into high quality gasoline hydrocarbon components (more than 90% branched/cyclic paraffinic products) over a rhenium-zeolite catalyst in high pressure hydrogen. In yet another embodiment, the metal function can be placed on H-beta to produce a catalyst which converts the synthesis gas mainly to a gas mixture containing low molecular olefins, such as ethylene and propylene.

FIG. 1 illustrates graphically the overall process of the present invention. Solid biomass, coal, and/or heavier oil is gasified to form syngas. The syngas is exposed to a zeolite-encaged molybdenum-based or rhenium-based catalyst. The product that results is a combination of gas and liquid. The liquid products are separated out using a gas-liquid separation unit and comprise the high quality end product. The gas products are recycled back for reprocessing.

The invention is further clarified by the following examples, which are intended to be purely illustrative of the use of the invention. Other embodiments of the invention will be apparent to those skilled in the art from a consideration of this specification or practice of the invention as disclosed herein. All percentages are on a mole percent basis and selectivities are on a carbon atom percent basis, unless noted otherwise.

EXAMPLE 1

Catalyst Synthesis

Mo/zeolite catalysts were prepared by incipient wetness impregnation of $(NH_4)_6Mo_7O_{24}4H_2O$ (Fisher Scientific) aqueous solution with the ammonium form of either: 1) ZSM-5 ($SiO_2/Al_2O_3$=23, 50, 80, and 280), 2) zeolite Y ($SiO_2/Al_2O_3$=80) or zeolite β ($SiO_2/Al_2O_3$=25) obtained from Zeolyst International. The designated Mo loading amount was 5 wt. % or 10 wt. %. The samples were finally calcined in air at 773 K for 3 h and pelletized into 0.25-0.5 mm particles for activity tests.

One detailed description of the preparation is as follows. Ninety-five (95) grams of H-ZSM-5 ($SiO_2/Al_2O_3$=50) were treated with an aqueous solution of 9.5 g of $(NH_4)_6Mo_7O_{24}.4H_2O$ dissolved in 47.7 grams of distilled water. The amount of water used in this incipient wetness preparation was just sufficient to fill the pores of the H-ZSM-5. The resulting solid was dried at 110° C. for 18 hours before it was calcined for 3 h at 500° C. Other catalysts were prepared using H-ZMS-5 having $SiO_2/Al_2O_3$=23, 80, and 280 and the protocol listed in this example.

EXAMPLE 2

Catalyst Synthesis

Ninety-five (95) grams of Y-faujasite ($SiO_2/Al_2O_3$=80) were treated with an aqueous solution of 9.5 g of $(NH_4)_6Mo_7O_{24}.4H_2O$ dissolved in 95 grams of distilled water. The amount of water used in this incipient wetness preparation was just sufficient to fill the pores of the Y-faujasite. The resulting solid was dried at 110° C. for 18 hours before it was calcined for 3 h at 500° C.

EXAMPLE 3

Catalyst Synthesis

Ninety-five (95) grams of H-beta zeolite ($SiO_2/Al_2O_3$=25) were treated with an aqueous solution of 9.5 g of $(NH_4)_6Mo_7O_{24}.4H_2O$ dissolved in 75 grams of distilled water. The amount of water used in this incipient wetness preparation was just sufficient to fill the pores of the Y-faujasite. The resulting solid was dried at 110° C. for 18 hours before it was calcined for 3 h at 500° C.

EXAMPLE 4

Catalyst Testing

The synthesis gas conversion to hydrocarbon liquids reaction was performed using a continuous flow, fixed-bed BTRS-Jr Laboratory Reactor Systems from Autoclave Engineers. Before the reaction, the catalyst (1.0 g) was pretreated in syngas ($H_2/CO$=1.0) flow at 673 K for 1 h. The gas hourly space velocity (GHSV) was 3000 h$^{-1}$. Liquid products were collected using a condenser kept at 271 K and the pressure was 500 psig and 1000 psig, respectively, and the effluent gas from the condenser was analyzed with an on-line gas chromatograph (GC, HP 6980) equipped with thermal conductive detector (TCD) and flame ionization detector (FID). A packed Molecular Sieve 5A column and a HP-1 capillary column were employed for separation of inorganic gases and light hydrocarbons. Liquid products, collected from the condenser, were separated into an oil phase and a water phase, and analyzed with GC-mass spectrometer (Agilent) equipped with DB-Wax capillary column for oxygenated compounds and HP-5ms capillary column for hydrocarbons. Six (6)% $N_2$ was added into the syngas as internal standard for CO conversion calculation. Selectivity of lower hydrocarbons was estimated on carbon basis based on FID signal. The catalyst activity and selectivity were calculated according to Equations (1) and (2), respectively, (below) where F° and F are the flow rates of the syngas and effluent gas after the reaction, respectively; $C°_i$ and $C_i$ are the concentrations of component i in the syngas and effluent gas, respectively; and n is the carbon number in a product i molecule:

$$\text{Conversion of } CO\ (\%) = [F°C°co - FCco] / F°C°co = 100 \times [C°co - C°_{N2}(Cco/C_{N2})] / C°co \qquad (1)$$

$$\text{Selectivity of product } I\ (\%) = nFC_i / [F°C°co - FCco] = 100 \times nC°_{N2}C_i / [C_{N2}C°co - C°_{N2}Cco] \qquad (2)$$

In the first reaction example (4), the GHSV was 3,000 h$^{-1}$, the reaction temperature was 573 K, the pressure was 1000 psi, and the catalyst was the 5 wt % Mo/HZSM-5 zeolite showing a $SiO_2/Al_2O_3$=23. The conversion and selectivity results are shown in Table 1.

EXAMPLE 5

Catalyst Testing

In example (5), the GHSV was 3,000 h$^{-1}$, the reaction temperature was 623 K, the pressure was 500 psi, and the catalyst was the 5 wt % Mo/HZSM-5 zeolite showing a $SiO_2/Al_2O_3$=23. The conversion and selectivity results are shown in Table 1.

EXAMPLE 6

Catalyst Testing

In example (6), the GHSV was 3,000 h$^{-1}$, the reaction temperature was 573 K, the pressure was 1000 psi, and the catalyst was the 5 wt % Mo/HZSM-5 zeolite showing a $SiO_2/Al_2O_3$=50. The conversion and selectivity results are shown in Table 1. The liquid product distribution is shown in Table 2.

EXAMPLE 7

Catalyst Testing

In example (7), the GHSV was 3,000 h$^{-1}$, the reaction temperature was 623 K, the pressure was 500 psi, and the catalyst was the 5 wt % Mo/HZSM-5 zeolite showing a $SiO_2/Al_2O_3=50$. The conversion and selectivity results are shown in Table 1. The liquid product distribution is shown in Table 2.

EXAMPLE 8

Catalyst Testing

In example (8), the GHSV was 3,000 $h^{-1}$, the reaction temperature was 573 K, the pressure was 1000 psi, and the catalyst was the 5 wt % Mo/HZSM-5 zeolite showing a $SiO_2/Al_2O_3=80$. The conversion and selectivity results are shown in Table 1. The liquid product distribution is shown in Table 2.

EXAMPLE 9

Catalyst Testing

In example (9), the GHSV was 3,000 $h^{-1}$, the reaction temperature was 623 K, the pressure was 500 psi, and the catalyst was the 5 wt % Mo/HZSM-5 zeolite showing a $SiO_2/Al_2O_3=80$. The conversion and selectivity results are shown in Table 1. The liquid product distribution is shown in Table 2.

EXAMPLE 10

Catalyst Testing

In example (10), the GHSV was 3,000 $h^{-1}$, the reaction temperature was 573 K, the pressure was 1000 psi, and the catalyst was the 5 wt % Mo/HZSM-5 zeolite showing a $SiO_2/Al_2O_3=280$. The conversion and selectivity results are shown in Table 1.

EXAMPLE 11

Catalyst Testing

In example (11), the GHSV was 3,000 $h^{-1}$, the reaction temperature was 623 K, the pressure was 500 psi, and the catalyst was the 5 wt % Mo/HZSM-5 zeolite showing a $SiO_2/Al_2O_3=280$. The conversion and selectivity results are shown in Table 1.

EXAMPLE 12

Catalyst Testing

In example (12), the GHSV was 3,000 $h^{-1}$, the reaction temperature was 573 K, the pressure was 1000 psi, and the catalyst was the 5 wt % Mo/H—Y zeolite showing a $SiO_2/Al_2O_3=80$. The conversion and selectivity results are shown in Table 1. The liquid product distribution is shown in Table 2.

EXAMPLE 13

Catalyst Testing

In example (13), the GHSV was 3,000 $h^{-1}$, the reaction temperature was 573 K, the pressure was 1000 psi, and the catalyst was the 5 wt % Mo/H-β zeolite showing a $SiO_2/Al_2O_3=25$. The conversion and selectivity results are shown in Table 1.

EXAMPLE 14

Catalyst Testing

In example (14), the GHSV was 3,000 $h^{-1}$, the reaction temperature was 623 K, the pressure was 500 psi, and the catalyst was the 5 wt % Mo/H-β zeolite showing a $SiO_2/Al_2O_3=25$. The conversion and selectivity results are shown in Table 1.

TABLE 1

Examples Showing Reaction Results

| Example Number | Catalyst | $SiO_2/Al_2O_3$ | Temperature, K | Pressure, psi |
|---|---|---|---|---|
| 4 | 5% Mo/HZSM-5 | 23 | 573 | 1000 |
| 5 | 5% Mo/HZSM-5 | 23 | 623 | 500 |
| 6 | 5% Mo/HZSM-5 | 50 | 573 | 1000 |
| 7 | 5% Mo/HZSM-5 | 50 | 623 | 500 |
| 8 | 5% Mo/HZSM-5 | 80 | 573 | 1000 |
| 9 | 5% Mo/HZSM-5 | 80 | 623 | 500 |
| 10 | 5% Mo/HZSM-5 | 280 | 573 | 1000 |
| 11 | 5% Mo/HZSM-5 | 280 | 623 | 500 |
| 12 | 5% Mo/H-Y | 80 | 573 | 1000 |
| 13 | 5% Mo/H-β | 25 | 573 | 1000 |
| 14 | 5% Mo/H-β | 25 | 623 | 500 |

| | CO | | Product Selectivity, % | |
| | | | | |
| Example Number | Conversion % | $CO_2$ | $C_1$-$C_3$ | $C_4^+$-Hydrocarbons |
|---|---|---|---|---|
| 4 | 10.5 | 58.6 | 15.5 | 2.9 |
| 5 | 47.5 | 54 | 47.1 | — |
| 6 | 15.2 | 49.6 | 24.5 | 25.8 |
| 7 | 31.8 | 51.7 | 35.2 | 13.0 |
| 8 | 32.4 | 62.3 | 26.7 | 11.0 |
| 9 | 51.2 | 57.6 | 41.8 | 0.6 |
| 10 | 20.6 | 64.2 | 25.5 | 10.3 |
| 11 | 44.6 | 61.7 | 36.5 | 1.8 |
| 12 | 13.9 | 38.6 | 30.4 | 31.0 |
| 13 | 13.5 | 61.0 | 39.0 | — |
| 14 | 39.1 | 61.3 | 38.7 | — |

TABLE 2

Liquid Product Distribution

| Example | Catalyst | $SiO_2/Al_2O_3$ | Temperature | Pressure, psi |
|---|---|---|---|---|
| 6 | 5% Mo/HZSM-5 | 50 | 573 | 1000 |
| 7 | 5% Mo/HZSM-5 | 50 | 623 | 500 |
| 8 | 5% Mo/HZSM-5 | 80 | 573 | 1000 |
| 9 | 5% Mo/HZSM-5 | 80 | 623 | 500 |
| 12 | 5% Mo/H-Y | 80 | 573 | 1000 |

| Example | Product Distribution Linear Alkanes | Distribution Linear Alkenes | % Aromatics | % Branched & Cyclized Alkanes |
|---|---|---|---|---|
| 6 | 15 | 5 | 30 | 50 |
| 7 | 12 | 5 | 45 | 38 |
| 8 | 5 | 0 | 65 | 30 |
| 9 | 5 | 2 | 80 | 13 |
| 12 | 35 | 5 | 10 | 50 |

This disclosure has for the first time described and fully characterized a novel process and system in which syngas is converted into high quality gasoline components, aromatic compounds, and lower molecular olefins in one reactor. The invention utilizes a novel molybdenum-zeolite catalyst in high pressure hydrogen for conversion and a novel rhenium-zeolite catalyst in place of the molybdenum-zeolite catalyst in high pressure hydrogen for conversion.

The above detailed description is presented to enable any person skilled in the art to make and use the invention. Specific details have been disclosed to provide a comprehensive understanding of the present invention and are used for explanation of the information provided. These specific details, however, are not required to practice the invention, as is apparent to one skilled in the art. Descriptions of specific applications, analyses, and calculations are meant to serve only as representative examples. Various suitable changes, modifications, combinations, and equivalents to the preferred embodiments may be readily apparent to one skilled in the art and the general principles defined herein may be applicable to other embodiments and applications while still remaining within the spirit and scope of the invention. The claims and specification should not be construed to unduly narrow the complete scope of protection to which the present invention is entitled. It should also be understood that the figures are presented for example purposes only. There is no intention for the present invention to be limited to the embodiments shown and the invention is to be accorded the widest possible scope consistent with the principles and features disclosed herein.

What is claimed is:

1. A process for the production of hydrocarbon fuel products having an aromatic content of about 90% or greater from synthesis gas comprising:

providing a synthesis gas; and providing an alcohol-forming catalyst;

providing a single reaction system and steam reformer in which the chemical reactions occur over the alcohol-forming catalyst found in the same matrix as a gasoline-forming catalyst, with the synthesis gas contacted in a Fischer-Tropsch reaction with the alcohol-forming catalyst in hydrogen;

wherein the alcohol-forming catalyst is a zeolite-encaged, molybdenum-based catalyst active for deoxy-aromatization of alcohols and synthesis gas to mixed alcohols, isomerization of alkanes, and aromatization;

wherein the alcohol-forming catalyst and the gasoline-forming catalysts are a cluster comprising a molybdenum oxide represented by $MoC_xO_y$ encaged in a zeolite and wherein the cluster comprises the active phase, and the cluster comprises a rhenium oxide represented by $ReC_xO_y$ encaged in a zeolite; and wherein the alcohol-forming catalyst produces alcohols from the synthesis gas.

2. The process of claim 1, wherein the cluster comprises a molybdenum sulfide.

3. The process of claim 2, wherein the cluster further comprises at least one metal modifier selected from the group consisting of the elements of Groups 1A and 2A of the Periodic Table and mixtures of the aforementioned elements.

4. The process of claim 2, wherein the zeolite comprises a support, and comprises one or more members selected from the group consisting of the zeolite-based heterogeneous catalyst HZSM-5, Y, Mordenite, MCM-22, MCM-41, H-Y-faujasite, and H-beta zeolites.

5. The process of claim 1, wherein the cluster comprises a rhenium sulfide.

6. The process of claim 1, wherein the cluster further comprises at least one metal modifier selected from the group consisting of the elements of Groups 1A and 2A of the Periodic Table and mixtures of the aforementioned elements.

7. The process of claim 1, wherein the zeolite comprises one or more supporting materials selected from the group consisting of the zeolite-based heterogeneous catalyst HZSM-5, Y, Mordenite, MCM-22, MCM-41, H-Y-faujasite, and H-beta zeolites and also functions as a support.

8. The process of claim 1, wherein the hydrocarbon fuel products comprise liquid hydrocarbons and gas hydrocarbons and wherein the products are separated in a separation unit.

9. The process of claim 8, wherein the liquid hydrocarbons comprise branched alkanes and alkyl-substituted aromatics.

10. The process of claim 9, wherein the gas hydrocarbons are fed to and processed through the steam reformer and returned to the single reactor system.

* * * * *